(No Model.) 2 Sheets—Sheet 1.
L. A. MANCINI.
DOUBLE HARNESS SADDLE AND YOKE.
No. 384,703. Patented June 19, 1888.
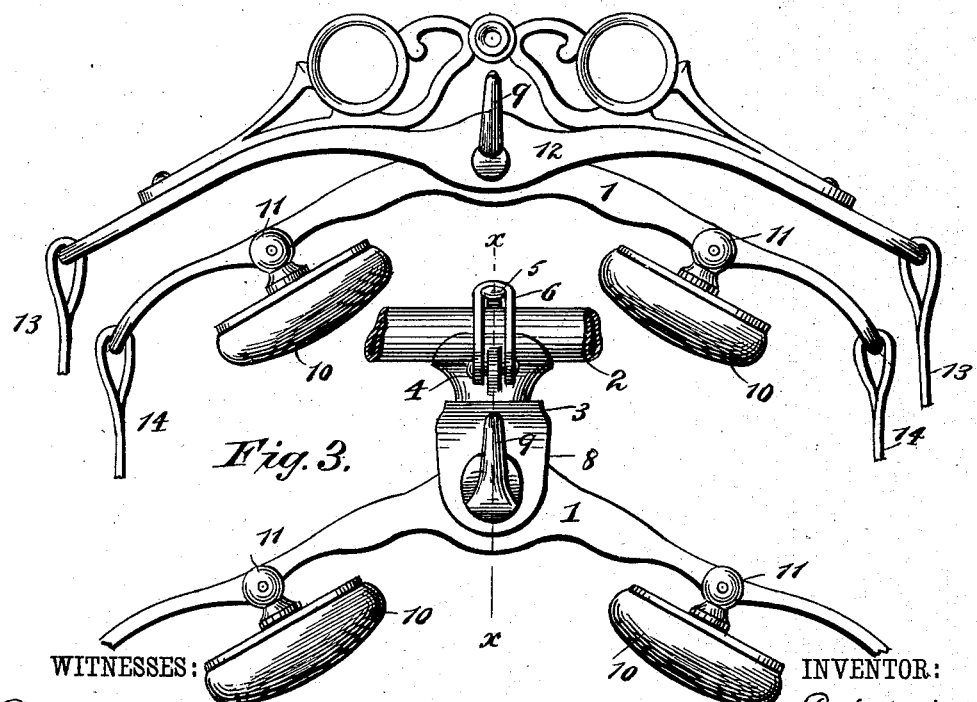
WITNESSES: INVENTOR:
L. A. Mancini
BY Munn & Co.
ATTORNEYS.

(No Model.) 2 Sheets—Sheet 2.
L. A. MANCINI.
DOUBLE HARNESS SADDLE AND YOKE.
No. 384,703. Patented June 19, 1888.
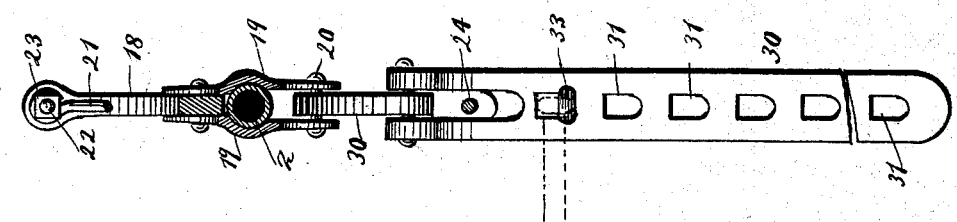
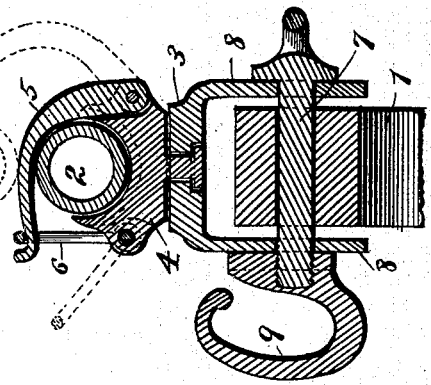
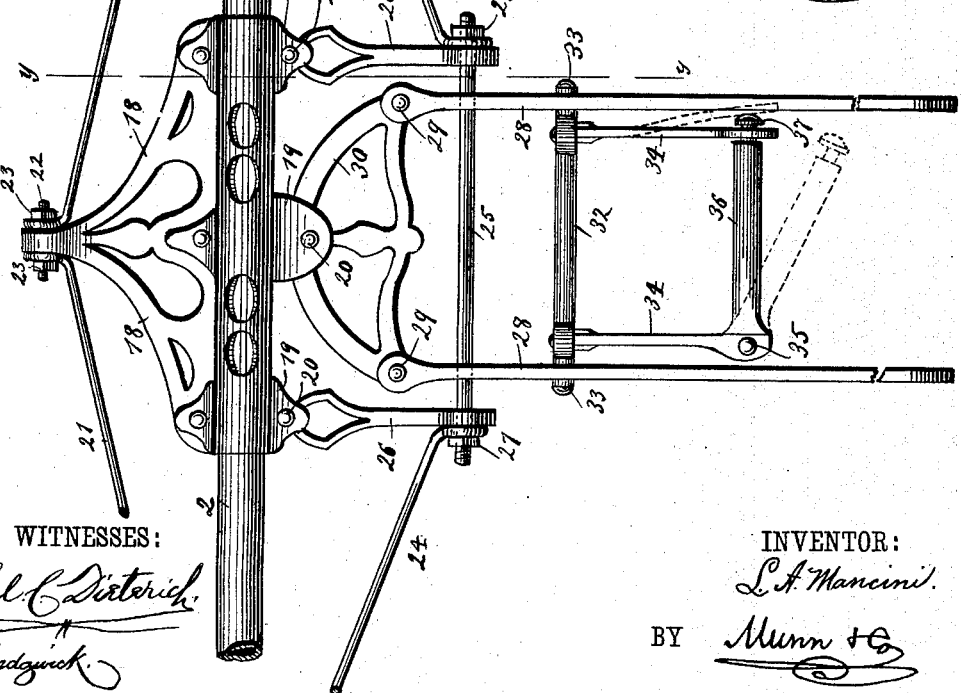
WITNESSES:
INVENTOR:
L. A. Mancini.
BY Munn & Co.
ATTORNEYS.

UNITED STATES PATENT OFFICE.

LOUIS A. MANCINI, OF MONTCLAIR, NEW JERSEY.

DOUBLE-HARNESS SADDLE AND YOKE.

SPECIFICATION forming part of Letters Patent No. 384,703, dated June 19, 1888.

Application filed October 1, 1887. Serial No. 251,203. (No model.)

*To all whom it may concern:*

Be it known that I, LOUIS A. MANCINI, of Montclair, in the county of Essex and State of New Jersey, have invented a new and Improved Double - Harness Saddle and Yoke, of which the following is a full, clear, and exact description.

This invention relates to a device in which harness-saddles are connected together and are adjustable upon their connection, and has for its object to allow for the movements of the horses and permit them to move freely and prevent friction of the saddle.

The invention consists of a double-harness saddle and yoke, and in details thereof, constructed and arranged as hereinafter described and claimed.

Reference is to be had to the accompanying drawings, forming a part of this specification, in which similar figures of reference indicate corresponding parts in all the figures.

Figure 1 is a side view of a saddle-tree with a yoke secured thereto to adapt it to a single horse. Fig. 2 is a front view thereof. Fig. 3 is a front view of a saddle-tree with double yoke rod or connection broken away. Fig. 4 is a side sectional view of the device on line *x x* in Fig. 3. Fig. 5 is a front view of the yoke rod or connection for the harness-saddles broken away, with pole attachment. Fig. 6 is a side view thereof, partly in section, on line *y y*, Fig. 5.

In the construction of this device two saddle-trees, 1, are adjustably mounted in any suitable manner upon a yoke or connecting bar or rod, 2, preferably of iron, and made hollow for lightness. The saddle-tree 1 is connected to yoke-rod 2 by means of a yoke, 3, having swiveled piece 4, with pivoted hook 5 and link 6 loosely encircling rod 2, and a bolt, 7, passing through saddle-tree 1 and flanges of yoke 3 and engaging a checkrein-hook, 9. The saddle-tree 1 is provided with pads 10, having pivots 11, whereby the pads will adjust themselves to the back of a horse. The piece 4, swiveled to saddle-tree 1, allows for any swerving of the horse, and the loose connection of yoke 3, by means of hook 5 and link 6, permits the saddle-tree and its connections to move on rod 2 if the horses move toward or from each other. When it is desired to employ the saddle-tree 1 with a single horse, the yoke 3 is removed therefrom by unscrewing bolt 7, and a yoke, 12, is attached, as shown in Figs. 1 and 2, having straps 13 for supporting the shafts. The saddle-tree 1 is provided with straps 14 15 and a ring or link, 16, to which a saddle-girth, 17, is secured. The irregular movements of the shafts arising from uneven ground will cause the yoke 12 to rock on saddle-tree 1 and thereby prevent any friction of the saddle upon the horse's back.

Upon the yoke-rod 2 is mounted a frame, 18, by means of plates 19 clamped thereto by bolts 20. The frame 18 is braced by rods 21, having one end fastened to the clamps 19ª and the other to frame 18 by a bolt, 22, and nuts 23. The frame is also braced by rods 24, having one end secured to the clamps 19ª and the other to a rod, 25, held in hangers 26 on the frame by means of nuts 27. The rod 25 passes through slotted bars 28, pivoted at 29 to a frame, 30, pivoted at 20 to plates 19. In slots or openings 31 in bars 28 is mounted a cross-bar, 32, having headed ends 33, whereby the bar 32 is locked therein. The latter has depending arms 34, to one of which is pivoted, as at 35, a bar, 36, having a headed end, 37, engaging a slot, 38, in the other depending arm 35. This last-described construction forms a clevis for the attachment of a wagon-pole, and provides for swinging of the latter and any sudden thrust of the yoke-rod. To attach a pole to bar 36 the arm 34 is released and swung away from headed end 38 and the pole slipped onto bar 36. The latter is then again secured to arm 34.

To adjust the clevis to poles of different heights it is swung to a horizontal position, as shown in dotted lines in Fig. 6, so that cross-bar 32 is rotated to bring its headed ends 33 in position to be released from slotted bars 28 when they are swung to one side. The cross-bar 32 is then adjusted in slotted bars 28 to the desired height. It will be seen by my invention that the saddles are raised from the horses' backs, so as to afford ventilation and prevent friction and secure a perfect fit. They are so connected together that in drawing mowing-machines, reapers, and heavy carts they will move and accommodate themselves to inequalities of the ground and all movements of the horses. One of the advantages of this double yoke and harness-saddle device is that the weight of the pole of the mowing-machine, reaper, &c., is carried on the horses' backs instead of their necks, as now done.

I do not desire to limit myself to the precise construction of parts shown and described, as I regard my invention as broadly covering adjustable harness-saddles mounted on a yoke or connecting-rod.

It is obvious that instead of the swiveled and pivoted connection of the saddle-trees with the connecting-rod any other universal joint may be employed.

Having thus described my invention, what I claim as new, and desire to secure by Letters Patent, is—

1. A double-harness saddle and yoke device consisting of a connecting bar or rod, swiveled pieces or plates adapted to slide thereon and detachably connected thereto, yokes pivoted to the swiveled plates, and saddle-trees pivoted to the yokes to rock laterally and having securing-straps, substantially as described.

2. In the double-harness saddle and yoke device herein described, the combination, with a saddle-tree, of a yoke secured thereto by a removable pin or bolt, substantially as described.

3. In the double-harness saddle and yoke device herein described, a yoke bar or rod connecting the saddle-trees, and having a frame adapted to swing laterally and supporting an adjustable clevis, substantially as described.

4. In the double-harness saddle and yoke device herein described, a yoke bar or rod connecting the saddle-trees, and having a frame carrying pivoted bars and a clevis adjustable in slots in said bars, substantially as described.

5. The combination, with connecting-rod 2, of saddle-trees 1, pivoted pads 10, bolt 7, yoke 3, hook 9, and swiveled piece 4, having hook 5 and link 6, substantially as described.

6. The combination, with rod 2 and saddle-trees 1, connected thereto, of a frame and pivoted slotted bars 28, and a clevis consisting of cross-bar 32, having headed ends engaging slots 31 and arms 34, and pivoted bar 36, engaging an arm, 34, substantially as described.

LOUIS A. MANCINI.

Witnesses:
EDWARD W. CADY,
C. SEDGWICK.